(12) United States Patent
O'Neill

(10) Patent No.: US 8,960,809 B2
(45) Date of Patent: Feb. 24, 2015

(54) CONTINUOUS MINER MID-CONVEYOR DRIVE

(71) Applicant: Joy MM Delaware, Inc., Wilmington, DE (US)

(72) Inventor: Michael L. O'Neill, Lucinda, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 13/775,446

(22) Filed: Feb. 25, 2013

(65) Prior Publication Data

US 2014/0239699 A1    Aug. 28, 2014

(51) Int. Cl.
  *E21C 27/24*   (2006.01)
  *E21C 35/20*   (2006.01)
  *E21F 13/06*   (2006.01)

(52) U.S. Cl.
  CPC .............. *E21C 27/24* (2013.01); *E21F 13/066* (2013.01); *E21C 35/20* (2013.01)
  USPC .............................................. 299/76; 299/64

(58) Field of Classification Search
  CPC ......... E21C 35/20; E21C 31/00; E21C 31/06; E21D 9/12
  USPC .................. 299/76, 78; 198/317, 319, 832
  See application file for complete search history.

(56) References Cited

U.S. PATENT DOCUMENTS

| 1,413,128 | A | | 4/1922 | Newdick |
| 1,508,634 | A | | 9/1924 | Wilson |
| 1,693,344 | A | | 11/1928 | Morgan |
| 1,882,096 | A | | 10/1932 | Shaw |
| 2,752,140 | A | | 6/1956 | Joy |
| 2,777,681 | A | | 1/1957 | Ball |
| 3,197,256 | A | * | 7/1965 | Hlinsky ........................ 299/64 |
| 3,210,123 | A | | 10/1965 | Delli-Gatti, Jr. |
| 3,279,855 | A | | 10/1966 | Evans |
| 4,031,997 | A | * | 6/1977 | Nelson ......................... 198/301 |
| 4,076,316 | A | * | 2/1978 | LeBegue ........................ 299/64 |
| 4,090,601 | A | * | 5/1978 | Freed, Jr. .................... 198/316.1 |
| 4,159,055 | A | * | 6/1979 | Eberle .......................... 198/512 |
| 4,277,105 | A | | 7/1981 | Taylor |
| 4,312,540 | A | * | 1/1982 | Thompson ..................... 299/11 |
| 4,784,439 | A | | 11/1988 | Wrulich et al. |
| 5,096,048 | A | | 3/1992 | Lachner et al. |

(Continued)

FOREIGN PATENT DOCUMENTS

| GB | 1396014 | 5/1975 |
| SU | 839897  | 6/1981 |
| SU | 856920  | 8/1981 |

*Primary Examiner* — David Bagnell
*Assistant Examiner* — Michael Goodwin
(74) *Attorney, Agent, or Firm* — Michael Best & Friedrich LLP

(57) ABSTRACT

A continuous miner includes a mining portion, a support frame connected to the mining portion, and a discharge portion pivotally attached to the support frame. The discharge portion swings laterally relative to the support frame about a pivot axis. The continuous miner also includes a conveyor extending across the support frame and discharge portion. The conveyor moves mined material from the mining portion to the discharge portion. The conveyor includes a conveyor chain, a rear roller, and a front roller. The continuous miner also includes a conveyor drive system for driving the conveyor chain. The conveyor drive system is located on a bottom surface of the continuous miner and between the rear roller and the front roller.

20 Claims, 5 Drawing Sheets

(56) References Cited

U.S. PATENT DOCUMENTS

| | | |
|---|---|---|
| 5,190,352 A | 3/1993 | LeBegue et al. |
| 5,720,527 A * | 2/1998 | Sartaine et al. ............ 299/64 |
| 5,758,760 A | 6/1998 | Vergeer et al. |
| 5,810,447 A | 9/1998 | Christopher et al. |
| 5,871,260 A * | 2/1999 | Delli-Gatti, Jr. ............ 299/19 |
| 6,971,509 B2 | 12/2005 | Ertel et al. |
| 2002/0033320 A1 * | 3/2002 | Matsuoka et al. ............ 198/835 |
| 2010/0270132 A1 | 10/2010 | Muller |

* cited by examiner

CONTINUOUS MINER MID-CONVEYOR DRIVE

FIELD OF THE INVENTION

The present invention relates to a continuous miner, and more particularly to a continuous miner with a conveyor drive system located along a bottom of the conveyor.

BACKGROUND OF THE INVENTION

Continuous miners are commonly used to haul or convey crushed material in an underground mine. A continuous miner typically includes a mining portion that gathers and directs material away from the wall of a mine, an elongate support frame connected to the mining portion, and a swinging discharge portion pivotally attached to the support frame. The continuous miner includes a conveyor that extends along the support frame and discharge portion. The conveyor moves material from the mining portion to the discharge portion and into a rail car, hopper, or other vehicle behind the continuous miner. The conveyor includes a conveyor chain driven by a conveyor drive system, as well as flight bars attached to the conveyor chain for engaging and moving the mined material.

Most conveyor drive assemblies are located along the mining portions of the continuous miners. The conveyor drive assemblies typically include drive sprockets engaged with the conveyor chains to move the conveyors. With this type of front drive system, the tension generated by a load of mined material is carried throughout a portion of the conveyor moving from the mining portion toward the discharge portion, around a tail roller at a rear end of the discharge portion, and along a portion of the conveyor moving from the discharge portion toward the mining portion. If there is any slack in the conveyor chain, the conveyor chain tends to bunch upward just rearward of the drive sprocket. Often this area of bunching is only a few millimeters below centrifugal loading arms at the mining portion, creating a high likelihood of collision between the conveyor chain and the loading arms. It has been found that collisions between a conveyor chain and centrifugal loading arms often occur even with a properly tensioned conveyor chain and empty conveyor. Thus, with a full conveyor (i.e. one loaded with mined material), and a front drive system, collisions are more prevalent and inflict more damage.

Furthermore, with a front drive system, when the discharge portion is swung to one side, the conveyor chain is typically pulled toward a side of the continuous miner as a result of the tension built up in the chain. On the underside of the continuous miner, where the chain is traveling toward the mining portion, the transition between the rear, swinging discharge portion and the fixed support frame creates a gap between the rear discharge portion and support frame. When a chain flight bar crosses the gap and strikes the rearmost edge of the support frame, it does so with a severe impact, further stressing the chain and creating undesired high levels of noise.

Some continuous miners have attempted to alleviate the problems of the front drive system by incorporating a conveyor drive system at the very rear of the machine. With this configuration, the chain life is significantly longer than with a front drive system. However, there are disadvantages to the rear drive system. For example, the height required for a rear drive system is generally unavailable for many continuous miners, since the very rear portion of the continuous miner must fit above the height of a shuttle car (or other vehicle) that receives the mined material off the rear of the continuous miner. Thus, rear drive assemblies are only viable for the largest of the continuous miners. Additionally, the rear drive assemblies run continuously in a stream of coal, ore, rock, or other mined material, which tends to pack between the rear drive sprockets and the conveyor chains, creating the potential for machine malfunction or slowing. Additionally, the weight of the rear sprocket drive at the very rear of the continuous miner stresses the pivot location where the discharge portion of the continuous miner swings, creating the potential for damage and/or malfunction.

SUMMARY

In accordance with one construction, a continuous miner includes a mining portion, a support frame connected to the mining portion, and a discharge portion pivotally attached to the support frame. The discharge portion swings laterally relative to the support frame about a pivot axis. The continuous miner also includes a conveyor extending across the support frame and discharge portion. The conveyor moves mined material from the mining portion to the discharge portion. The conveyor includes a conveyor chain, a rear roller, and a front roller. The continuous miner also includes a conveyor drive system for driving the conveyor chain. The conveyor drive system is located on a bottom surface of the continuous miner and between the rear roller and the front roller.

In accordance with another construction, a continuous miner includes a mining portion having a plurality of rotary cutting heads and a cutting head boom, the cutting head boom having a first end and a second end, the rotary cutting heads attached to the cutting head boom at the first end. The continuous miner also includes a support frame pivotally attached to the second end, and a loading pan pivotally attached to the support frame, the loading pan having a top surface inclined at a downward angle relative to the support frame. The continuous miner also includes a discharge portion pivotally attached to the support frame, the discharge portion configured to swing laterally relative to the support frame about a pivot axis. The continuous miner also includes a conveyor extending across the support frame and discharge portion, the conveyor moving mined material from the mining portion to the discharge portion, the conveyor including a conveyor chain, flight bars attached to the conveyor chain, a rear roller in continuous contact with the conveyor chain, and a front roller in continuous contact with the conveyor chain, the conveyor chain forming a continuous loop about the rear roller and front roller. The continuous miner also includes conveyor drive system for driving the conveyor chain, the conveyor drive system located on a bottom surface of the continuous miner and between the rear roller and the front roller.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
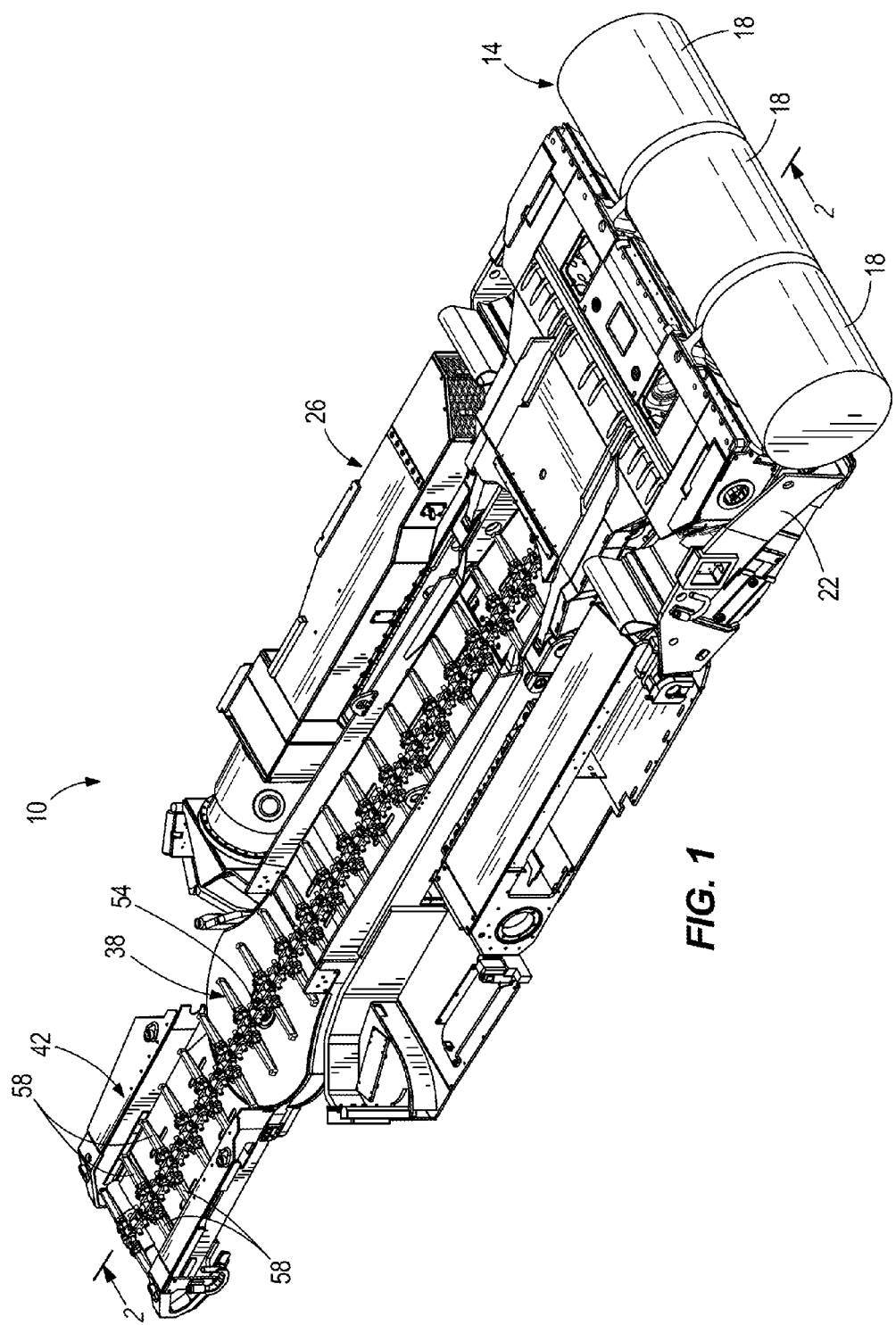
FIG. 1 is a top perspective view of a continuous miner according to one construction of the invention.
Figure 2:
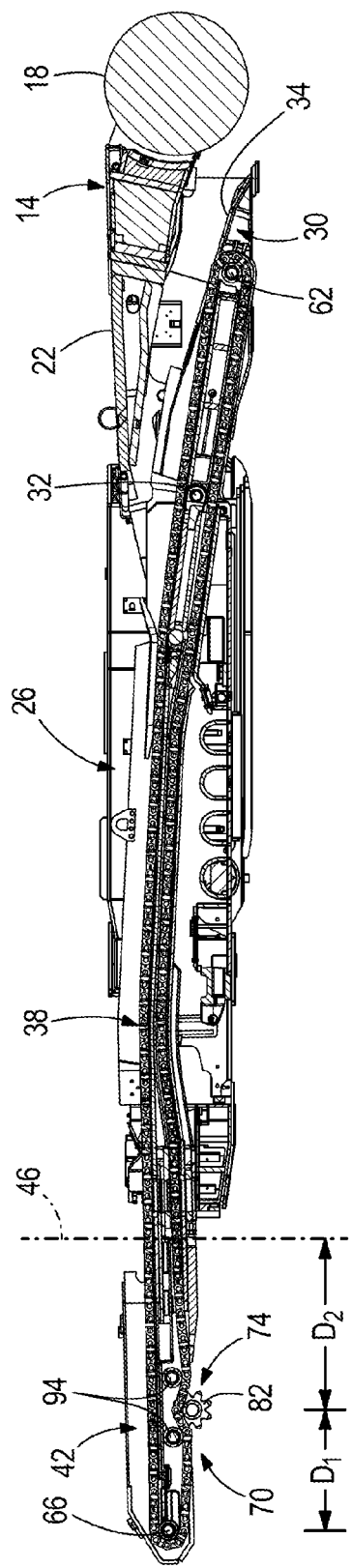
FIG. 2 is a cross-sectional view of the continuous miner of FIG. 1, taken along line 2-2 in FIG. 1.

FIG. 1 is a top perspective view of a continuous miner 10. The continuous miner 10 includes a mining portion 14 used to mine material, including but not limited to coal, ore, and rock, from an underground mine. The mining portion 14 includes a plurality of rotary cutting heads 18. The rotary cutting heads 18 are used to crush, drag, cut, and/or otherwise remove material from the wall of a mine. With reference to FIG. 2, the rotary cutting heads 18 rotate clockwise, so as to direct material in a downward, and rearward, direction relative to the rest of the continuous miner 10. While not illustrated, the rotary cutting heads 18 can include sharp projections or cutting teeth that dig into the mine wall and facilitate removal of material. While three rotary cutting heads 18 are shown, in some constructions other numbers of rotary cutting heads 18 can be used, including but not limited to one, two, four, or other numbers of rotary cutting heads 18.

The mining portion 14 further includes a cutting head boom 22. The cutting head boom 22 is attached to the rotary cutting heads 18 on a first end of the boom 22, and is attached to a support frame 26 on a second end of the boom 22. The boom 22 is configured to pivot, relative to the support frame 26, so as to direct the rotary cutting heads 18 into a desired position. For example, in a first position the rotary cutting heads 18 can be rotated away from and out of contact with a mine wall, and in a second position the rotary cutting heads 18 can be rotated toward and into contact with the mine wall.

With reference to FIG. 2, a front end of the support frame 26 includes a loading pan 30 pivotally attached to the support frame 26 about a pivot point 32. The loading pan 30 is used to collect material that is mined by the rotary cutting heads 18. The loading pan 30 extends beneath the cutting head boom 22. While only a single loading pan 30 is illustrated, in some constructions more than one loading pan 30 can be used to collect mined material. A top surface 34 of the loading pan 30 is angled downwardly, relative to the support frame 26, so as to provide an inclined surface upon which mined material is directed upwards, and rearwards, onto a conveyor 38.

Figure 3:
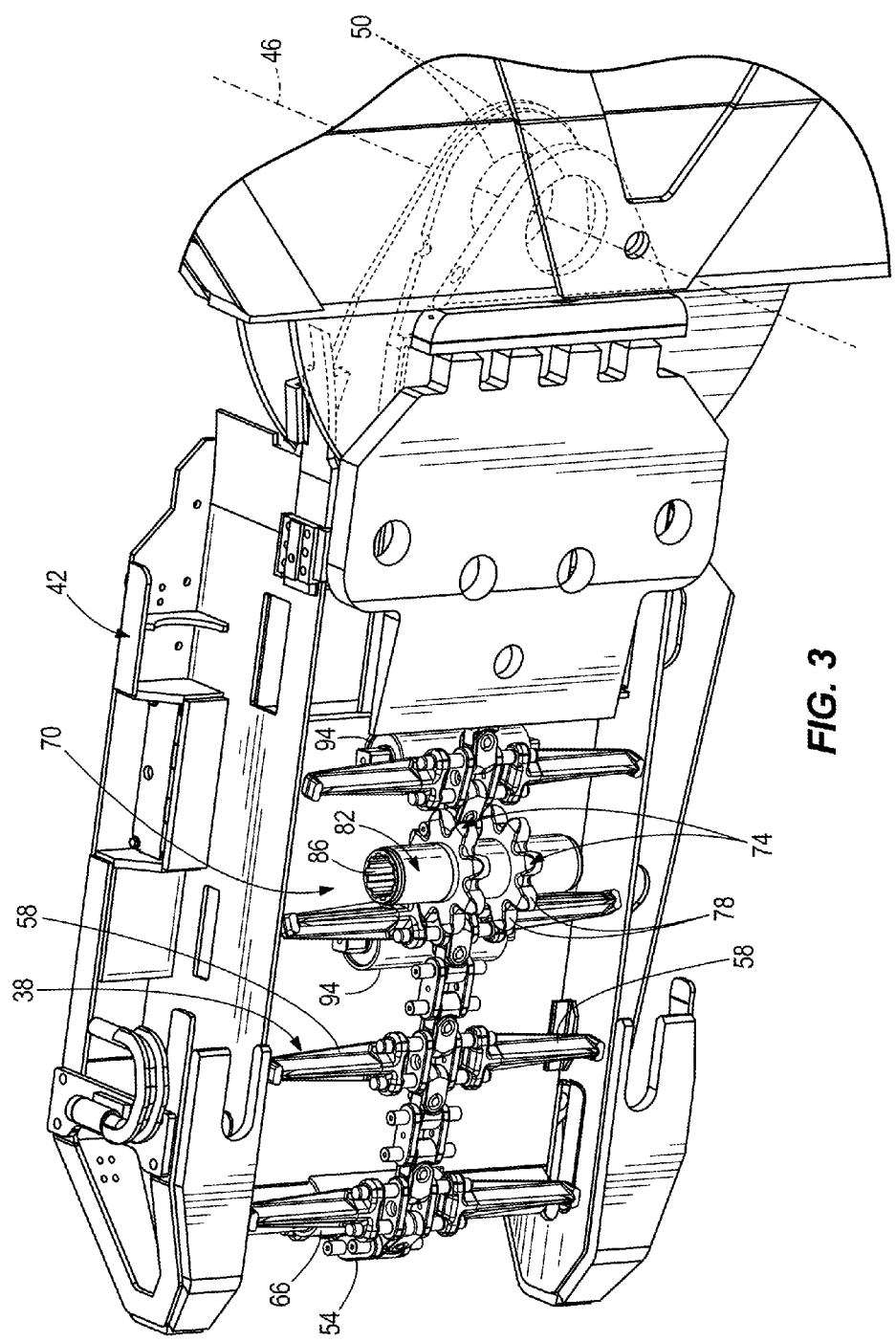
FIG. 3 is a bottom perspective view of the rear, discharge portion of the continuous miner of FIG. 1

With reference to FIGS. 1-3, the continuous miner 10 further includes a rear, discharge portion 42. The discharge portion 42 is pivotally attached to the support frame 26 about a pivot axis 46. As illustrated in FIG. 3, the pivot axis 46 extends through two openings 50 aligned along a front of the rear discharge portion 42. The discharge portion 42 is configured to swing laterally relative to the support frame 26 about the pivot axis 46, so that mined material can be distributed to various locations behind the continuous miner 10. The mining portion 14 and discharge portion 42 are connected along opposite ends of the support frame 26.

With reference to FIGS. 1-3, the conveyor 38 extends across both the support frame 26 and the discharge portion 42, and is used to move mined material from the mining portion 14 to the discharge portion 42. The conveyor 38 includes a conveyor chain 54 and flight bars 58 attached to the conveyor chain 54. The conveyor chain 54 forms a continuous loop within the continuous miner 10 (FIG. 2). The flight bars 58 are spaced equidistantly apart along the conveyor chain 54, and are used to help move the mined material across the support frame 26 and discharge portion 42. In some constructions, the spacing between the flight bars 58 can be altered. Various numbers of and configurations for the flight bars 58 can be used. In some constructions, rather than utilizing flight bars 58, different structures can be used. For example, in some constructions the conveyor chain 54 can be attached to a pan(s) or flat conveyor belt(s) that is moved around the continuous miner 10. Furthermore, in some constructions more than one chain 54 can be used. For example, two conveyor chains 54 in parallel can be used instead of a single chain.

With reference to FIG. 2, the conveyor 38 further includes a front roller or sprocket 62. The front roller or sprocket 62 is a forward-most point of the conveyor 38 within the continuous miner 10, and provides a turn-around point for the conveyor chain 54. The conveyor chain 54 is in engagement with the front roller or sprocket 62. The front roller or sprocket 62 changes the direction of the conveyor chain 54 such that the conveyor chain 54 moves from the discharge portion 42 toward the mining portion 14 beneath the front roller or sprocket 62, and moves from the mining portion 14 toward the discharge portion 42 above the front roller or sprocket 62.

The conveyor 38 further includes a rear roller or sprocket 66. The rear roller or sprocket 66 is a rearward-most point of the conveyor 38 within the continuous miner 10, and provides another turn-around point for the conveyor chain 54. The conveyor chain 54 is in engagement with the rear roller or sprocket 66. The rear roller or sprocket 66 changes the direction of the chain 54 such that the chain 54 moves from the mining portion 14 toward the discharge portion 42 above the rear roller or sprocket 66, and moves from the discharge portion 42 toward the mining portion 14 below the rear roller or sprocket 66.

The continuous miner 10 further includes a conveyor drive system 70. The conveyor drive system 70 includes two drive sprockets 74. The drive sprockets 74 drive movement of the conveyor chain 54 around the loop illustrated in FIG. 2. Specifically, and with reference to FIG. 3, the drive sprockets 74 are provided with teeth 78 constructed and arranged to drivingly engage the chain 54. Although the illustrated drive sprockets 74 include a particular number of teeth 78, it is to be appreciated that other constructions may utilize fewer or more teeth 78 depending, for example, on the pitch of the particular type of conveyor chain 54 being used. Furthermore, while the illustrated construction includes two drive sprockets 74, it is possible for other constructions to use a single drive sprocket 74, or more than two drive sprockets 74.

Figure 4:
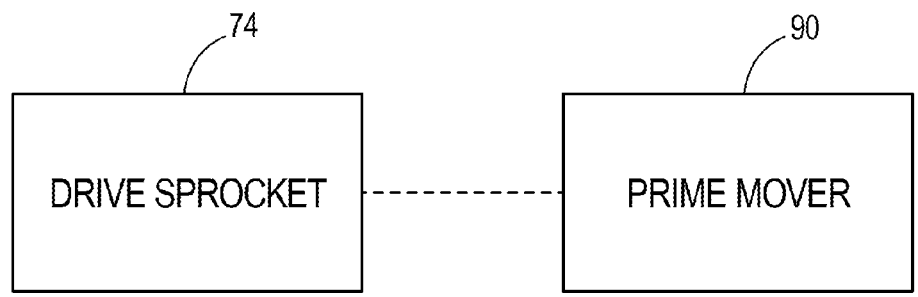
FIG. 4 is a schematic illustration of a conveyor drive system and prime mover used to power the conveyor drive system.

With reference to FIGS. 3 and 4, the drive sprockets 74 are attached to, or formed integrally with, a drive shaft 82. The drive shaft 82 extends generally parallel to the plurality of flight bars 58, and generally perpendicular to the direction of motion of the conveyor chain 54. The drive shaft 82 includes an opening 86. The opening 86 is configured to receive a power take off shaft (not shown) from a prime mover 90 (e.g. a motor). When the drive shaft 82 is turned via the prime mover 90, the drive sprockets 74 are turned with the drive shaft 86, providing a mechanism by which the conveyor 38 is moved. Thus, as illustrated in FIG. 4, the prime mover 90 operatively communicates with the drive sprocket(s) 74 to advance the conveyor 38.

With continued reference to FIG. 2, the conveyor drive system 70 further includes two retention rollers 94 located above the drive sprockets 74. The retention rollers 94 are positioned between the drive sprockets 74 and a portion of the conveyor chain 54 that is moving from the mining portion 14 toward the discharge portion 42. The conveyor chain 54 moves between the retention rollers 94 and the drive sprockets 74, along a top of the drive sprockets 74. The retentions rollers 94 are configured to maintain tension in the chain 54 and inhibit slack in the chain 54 by directing the conveyor chain 54 over the drive sprockets 74. The retention rollers 94 rotate about axes that are parallel to an axis of rotation of the drive shaft 82.

Figure 2A:
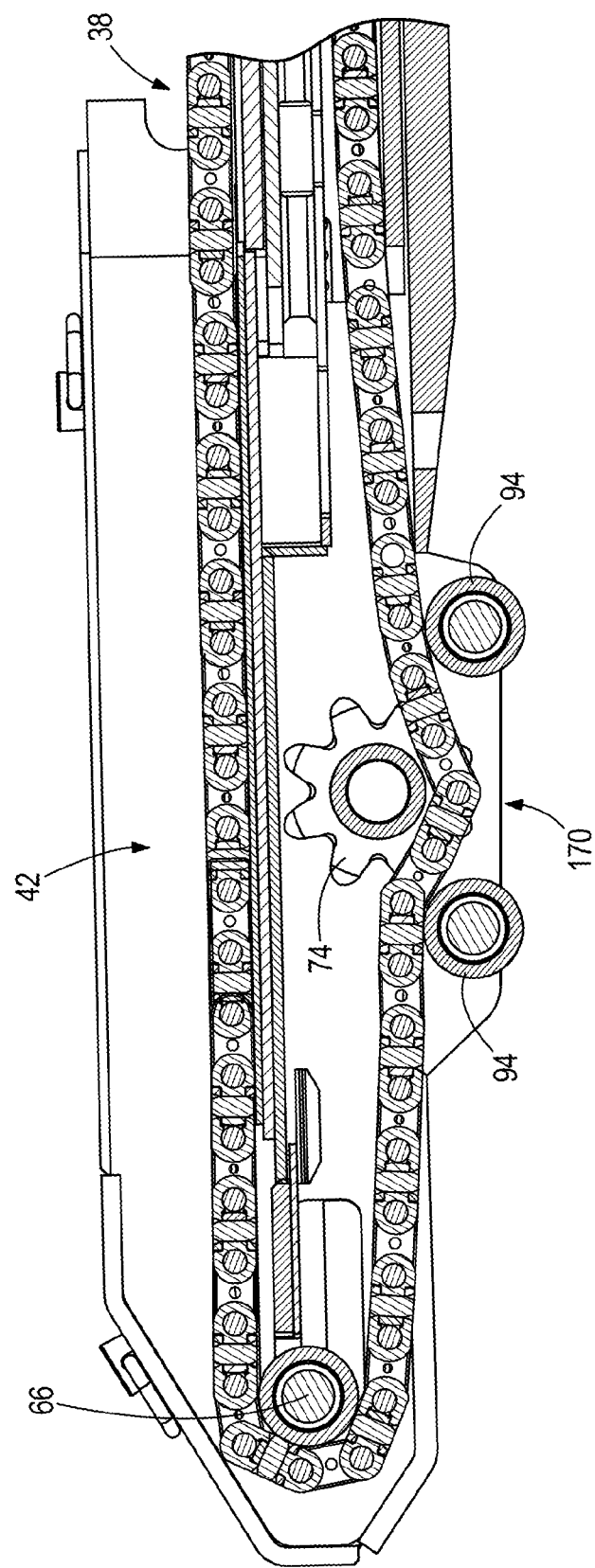
FIG. 2A is a cross-sectional view of the miner of FIG. 1, illustrating a conveyor drive system according to another embodiment of the invention.

FIG. 2A illustrates a conveyor drive system 170 according to another embodiment of the invention. In conveyor drive system 170, the retention rollers 94 are located below the drive sprockets 74, such that the drive sprockets 74 are positioned between the retention rollers 94 and a portion of the conveyor chain 54 that is moving from the mining portion 14 toward the discharge portion 42. In this construction the conveyor chain 54 moves along a bottom of the drive sprockets 74, instead of along the top of the drive sprockets 74 as illustrated in FIG. 2.

While two retention rollers 94 are illustrated, in other constructions different numbers of retention rollers 94 can be used. For example, in some constructions a single retention roller 94 can be used. In other constructions three, four, or even more retention rollers 94 can be used. In some constructions no retention rollers 94 are used. Rather, the conveyor drive system 70 includes only the drive sprocket(s) 74 and drive shaft 86.

Additionally, in some constructions, rather than utilizing retention rollers 94, retention sprockets are used instead. The retention sprockets operate similarly to the retention rollers 94, in terms of maintaining tension within the conveyor chain 54 and facilitating directional movement of the chain 54. Rather than simply having the chain 54 roll across the retention rollers 94, the retention sprockets instead further engage the conveyor chain 54, similar to drive sprockets 74, and provide added grip and contact with the conveyor chain 54. In yet other constructions one or more plates and/or shoes are used instead of the retention rollers 94 in order to maintain tension within the conveyor chain 54 and facilitate directional movement of the conveyor chain 54.

With continued reference to FIG. 2, the drive shaft 82 is located a distance D1 from the rear roller 66, and a distance D2 from the pivot axis 46. The distance D1 is approximately equal to the distance D2. The distance D1 is measured from an axis of rotation of the rear roller 66 to an axis of rotation of the drive shaft 82, and the distance D2 is measured from an axis of rotation of the drive shaft 82 to the pivot axis 46. As illustrated in FIG. 2, the conveyor drive system 70 is located approximately halfway between the rear roller or sprocket 66 and the pivot axis 46 (i.e. the ratio of D1 to D2 is approximately 1). The ratio of D1 to D2 is preferably between approximately 0.5 and 2.0. In some constructions, the ratio of D1 to D2 is between approximately 0.75 and 1.5. In some constructions, the ratio of D1 to D2 is between approximately 0.9 and 1.1. Other ranges and values for the ratio are also possible. For example, in some constructions the ratio of D1 to D2 is greater than 2.0. In other constructions the ratio of D1 to D2 is less than 0.5.

As described above, both front drive and rear drive systems suffer from certain disadvantages. In particular, a front drive system leads to a short life span for a conveyor chain, and undesirably high levels of impact and noise when flight bars strike a rear portion of a support frame. A rear drive system is only viable for the largest of the continuous miners. Additionally, a rear drive system creates the potential for machine malfunction or slowing due to packing of material in a conveyor chain, and causes undesirable stress on the pivot location.

By using a conveyor drive system 70 that is located between the rear roller or sprocket 66 and the pivot location 46 of the discharge portion 42, the disadvantages of the front drive and rear drive systems are alleviated. In particular, in contrast to a front drive system, the life of the conveyor chain 54 is increased, since the conveyor chain 54 will no longer bunch at the front of the continuous miner 10, resulting in fewer and/or less stressful collisions between the conveyor chain 54 and any part of the mining portion 14. Additionally, because the tension in the conveyor chain 54 is maintained rear of the pivot location 46, there will be fewer high impact and high noise-generating collisions between the conveyor chain 54 and a rear portion of the support frame 26 when the discharge portion 42 is swinging. With the configuration of the continuous miner 10 illustrated in FIGS. 1-3, the entire portion of the conveyor chain 54 that is located between drive sprockets 74 and the front roller or sprocket 62 would only require enough tension to prevent excess drag. Thus, as the conveyor chain 54 passes a gap between the swinging discharge portion 42 and the fixed support frame 26, the conveyor chain 54 would be under significantly less stress than with a front drive system.

Furthermore, in contrast to a rear drive system, the location of conveyor drive system 70 is far enough forward of the rear roller 66 that the drive system 70 does not interfere with shuttle cars or other vehicles near the rear of the continuous miner 10. Thus, the drive system 70 can be used on significantly more continuous miners 10 than with a rear drive system. Additionally, the location of drive system 70 inhibits the type of material buildup problems associated with a rear drive system. This is because between the rear roller or sprocket 66 and the drive sprockets 74, there would be ample opportunity for coal, dirt, or other material and debris to fall away from the chain 54, eliminating the difficulties with packing that occurs on a rear drive system. Finally, the location of the drive system 70 places significantly less stress on the pivot location 46 than with a rear drive system, thus increasing the life and operability of the pivoting discharge portion 42.

While the conveyor drive system 70 is illustrated as being located between the rear roller or sprocket 66 and pivot axis 46, in some constructions the conveyor drive system 70 is instead located on the support frame 26. For example, the conveyor drive system 70 could be located along a rear portion of the support frame 26, such that the conveyor drive system 70 is still located generally between the rear roller or sprocket 66 and the front roller or sprocket 62. Even if the drive sprockets 74 are located forward of the pivot location 46, the conveyor drive system 70 could still alleviate some of the problems associated with the front drive and rear drive assemblies. For example, the life of the conveyor chain 54 would be increased as compared with a front drive system, the location of conveyor drive system 70 would be far enough forward that it would not interfere with shuttle cars or other vehicles near the rear of the continuous miner 10, the location of drive system 70 would inhibit the type of material buildup problems associated with a rear drive system, and the location of the drive system 70 would place significantly less stress on the pivot location 46 than with a rear drive system, thus increasing the life and operability of the pivoting discharge portion 42.

Although the invention has been described in detail with reference to certain preferred embodiments, variations and modifications exist within the scope and spirit of one or more independent aspects of the invention as described.

What is claimed is:

1. A continuous miner comprising:
   a mining portion;
   a support frame connected to the mining portion;
   a discharge portion pivotally attached to the support frame, the discharge portion configured to swing laterally relative to the support frame about a pivot axis;
   a conveyor extending across the support frame and discharge portion, the conveyor moving mined material from the mining portion to the discharge portion, the conveyor including a conveyor chain, a rear roller, and a front roller; and
   a conveyor drive system for driving the conveyor chain, the conveyor drive system located on a bottom surface of the continuous miner and including a drive member located between the rear roller and the front roller that is engaged directly with the conveyor chain.

2. The continuous miner of claim 1, wherein the drive member is a drive sprocket and wherein the conveyor drive system includes a retention roller, the conveyor chain engaged with both the drive sprocket and the retention roller, the retention roller located above the drive sprocket and positioned between the drive sprocket and a portion of the conveyor chain moving from the mining portion toward the discharge portion.

3. The continuous miner of claim 1, wherein the conveyor drive system is located between the rear roller and the pivot axis.

4. The continuous miner of claim 3, wherein the drive member is a drive sprocket, and wherein a ratio of a distance between an axis of rotation of the rear roller and an axis of rotation of the drive sprocket, and a distance between the axis of rotation of the drive sprocket and the pivot axis is between approximately 0.5 and 2.0.

5. The continuous miner of claim 4, wherein the ratio is between approximately 0.75 and 1.5.

6. The continuous miner of claim 5, wherein the ratio is between approximately 0.9 and 1.1.

7. The continuous miner of claim 3, wherein the conveyor drive system is located approximately halfway between the rear roller and the pivot axis.

8. The continuous miner of claim 1, wherein the rear roller redirects the conveyor from a direction in which the conveyor is moving from the mining portion toward the discharge portion to a direction in which the conveyor is moving from the discharge portion toward the mining portion.

9. The continuous miner of claim 1, wherein the mining portion and discharge portion are coupled to the support frame at opposite ends thereof.

10. The continuous miner of claim 1, wherein the mining portion includes a plurality of rotary cutting heads.

11. The continuous miner of claim 10, wherein the mining portion includes a cutting head boom attached to the support frame and the rotary cutting heads.

12. The continuous miner of claim 1, further including a loading pan pivotally attached to the support frame.

13. The continuous miner of claim 1, wherein the conveyor chain forms a continuous loop within the continuous miner.

14. The continuous miner of claim 1, wherein the conveyor includes a plurality of flight bars attached to the conveyor chain.

15. A continuous miner comprising:
    a mining portion including a plurality of rotary cutting heads and a cutting head boom, the cutting head boom having a first end and a second end, the rotary cutting heads attached to the cutting head boom at the first end;
    a support frame pivotally attached to the second end;
    a loading pan pivotally attached to the support frame, the loading pan having a top surface inclined at a downward angle relative to the support frame;
    a discharge portion pivotally attached to the support frame, the discharge portion configured to swing laterally relative to the support frame about a pivot axis;
    a conveyor extending across the support frame and the discharge portion, the conveyor moving mined material from the mining portion to the discharge portion, the conveyor including a conveyor chain, a rear roller in continuous contact with the conveyor chain, and a front roller in continuous contact with the conveyor chain, the conveyor chain forming a continuous loop about the rear roller and front roller; and
    a conveyor drive system for driving the conveyor chain, the conveyor drive system located on a bottom surface of the continuous miner and including a drive member located between the rear roller and the front roller that is engaged directly with the conveyor chain.

16. The continuous miner of claim 15, wherein the drive member is a drive sprocket and wherein the conveyor drive system includes a retention roller, the conveyor chain engaged with both the drive sprocket and the retention roller, the retention roller located above the drive sprocket and positioned between the drive sprocket and a portion of the conveyor chain moving from the mining portion toward the discharge portion.

17. The continuous miner of claim 15, wherein the conveyor drive system is located between the rear roller and the pivot axis.

18. The continuous miner of claim 17, wherein the drive member is a drive sprocket, and wherein a ratio of a distance between an axis of rotation of the rear roller and an axis of rotation of the drive sprocket, and a distance between the axis of rotation of the drive sprocket and the pivot axis is between approximately 0.5 and 2.0.

19. The continuous miner of claim 18, wherein the ratio is between approximately 0.75 and 1.5.

20. The continuous miner of claim 19, wherein the ratio is between approximately 0.9 and 1.1.

* * * * *